Dec. 11, 1928.                                                              1,695,046
C. L. HIPPENSTEEL
TESTING APPARATUS
Filed Dec. 23, 1926                        2 Sheets-Sheet 1

Inventor:
Claude L. Hippensteel
by
Attorney

Dec. 11, 1928.　　　　　　　　　　　　　　　　1,695,046
C. L. HIPPENSTEEL
TESTING APPARATUS
Filed Dec. 23, 1926　　　　2 Sheets-Sheet 2
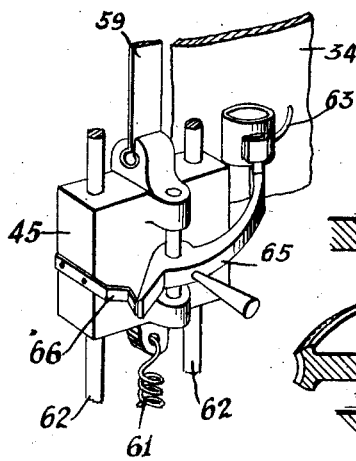
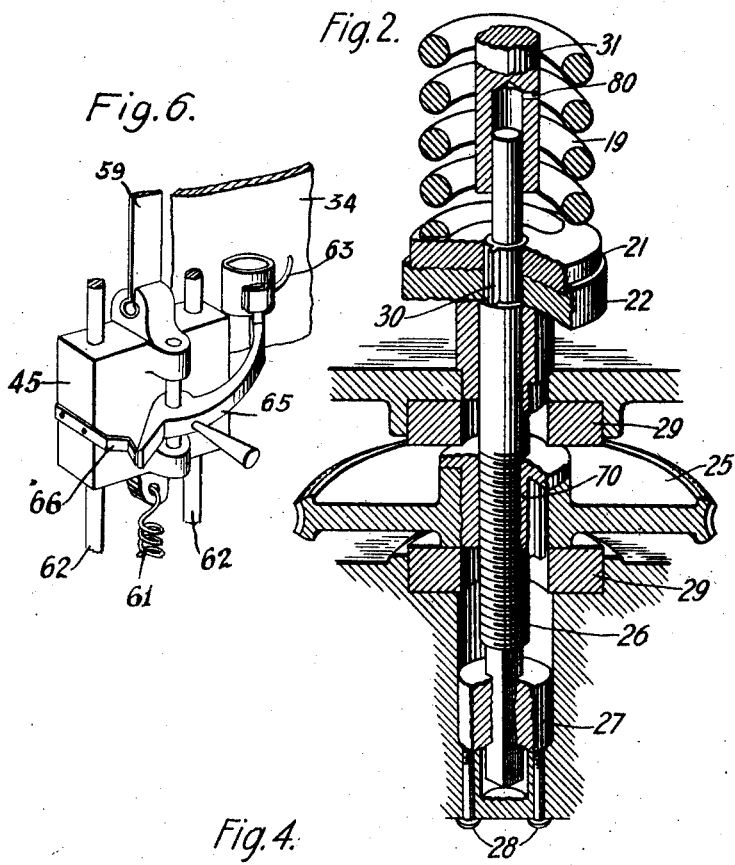
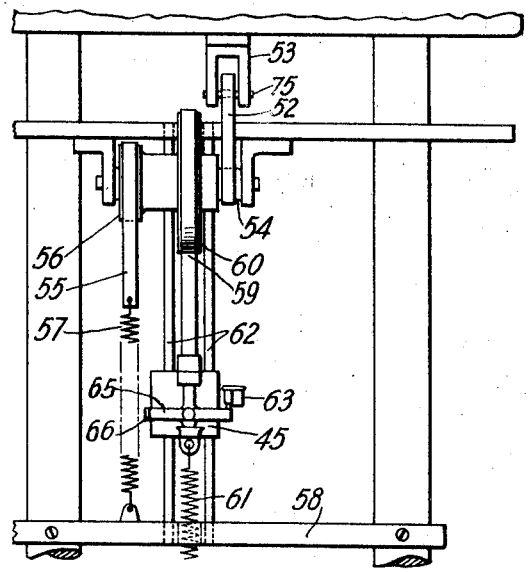
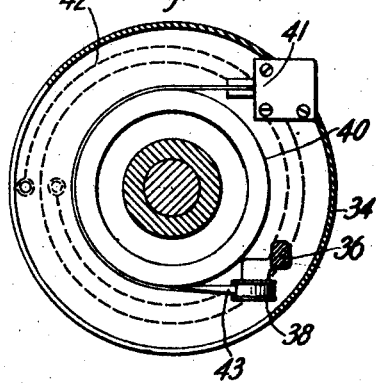
Inventor:
Claude L. Hippensteel
by　　　　　　　
　　　　　Attorney Patented Dec. 11, 1928.

1,695,046

UNITED STATES PATENT OFFICE.

CLAUDE L. HIPPENSTEEL, OF ELIZABETH, NEW JERSEY, ASSIGNOR, BY MESNE ASSIGNMENTS, TO WESTERN ELECTRIC COMPANY, INCORPORATED, OF NEW YORK, N. Y., A CORPORATION OF NEW YORK.

TESTING APPARATUS.

Application filed December 23, 1926. Serial No. 156,578.

This invention relates to mechanical testing and particularly to a method and machine for testing the physical properties of the insulation of electrical conductors, its general object being to facilitate the determination of those properties.

Specific objects are to measure the ability of the insulating material of an insulated conductor, to resist cutting or crushing by the conductor and to withstand bending.

While a testing apparatus, in accordance with the present invention, may be adapted for testing various materials and various properties of materials, the embodiment of the invention herein shown and described is particularly useful for determining the ability of rubber or other insulating material to resist cutting by a conductor and to withstand severe bending.

One method which has been employed heretofore for this determining property of insulating materials is to place the insulated conductor in contact with a taut wire of definite size and to apply a definite pressure thereto for a specified time. The establishment of an electrical contact is used to indicate the complete penetration of the insulation by the cutting wire. It has been attempted to determine the brittleness of an insulating material by wrapping the insulated conductor about itself in a certain fashion a given number of times and then inspecting for signs of rupture. Tests such as these were found to be not entirely satisfactory. One reason for this is that neither test is very accurate and neither affords a numerical measure of the relative quality of one sample as compared with another. Furthermore, tensile strength and elongation tests made on samples of insulation removed from the wire are unsuitable because it is ordinarily difficult to make accurate and reliable tests of this sort on samples of the insulation obtainable from small gauge insulated wire. It is uncertain moreover, how results of such tests may be related to the performance of an insulated wire under certain special conditions of compression and wrapping which the insulation is required to withstand in service.

In accordance with one embodiment of the present invention, means are provided for applying pressure to an insulated conductor at a certain uniform rate and for recording graphically the relation between the pressure applied and the thickness of the compressed insulation. The compressive load at a portion of the curve thus recorded where a sudden decrease in thickness is indicated because of rupture of the insulation, affords a numerical measure of the ability of the insulating material to resist cutting by the conductor. A characteristic relation which exists between the decrease in thickness of the insulation up to this point and the brittleness of the insulating material, affords a measure of the ability of the insulation to withstand severe bending. The advantages of testing the insulation of electrical conductors with a machine constructed in accordance with the present invention reside not only in the application of the test directly to the insulation positioned on the wire but also in obtaining increased accuracy and reliability and greater speed of testing.

The invention may be readily understood by referring to the following detailed description and the drawing, in which:

Fig. 1 is a front elevation of a testing machine in accordance with the present invention, portions having been removed in order to better illustrate the invention.

Fig. 2 is a perspective view in partial section of a portion of the testing machine illustrating parts of the machine not shown in Fig. 1.

Fig. 3 is a sectional view taken along the line 3—3 of Fig. 1.

Fig. 4 is a side elevation of a portion of the machine shown in Fig. 1, illustrating a part of the recording mechanism, and Fig. 5 shows typical curves that are obtained when different classes of insulating compounds are tested with a machine constructed in accordance with this invention and Fig. 6 is a detail view of the pen carriage.

Figures 1, 5:
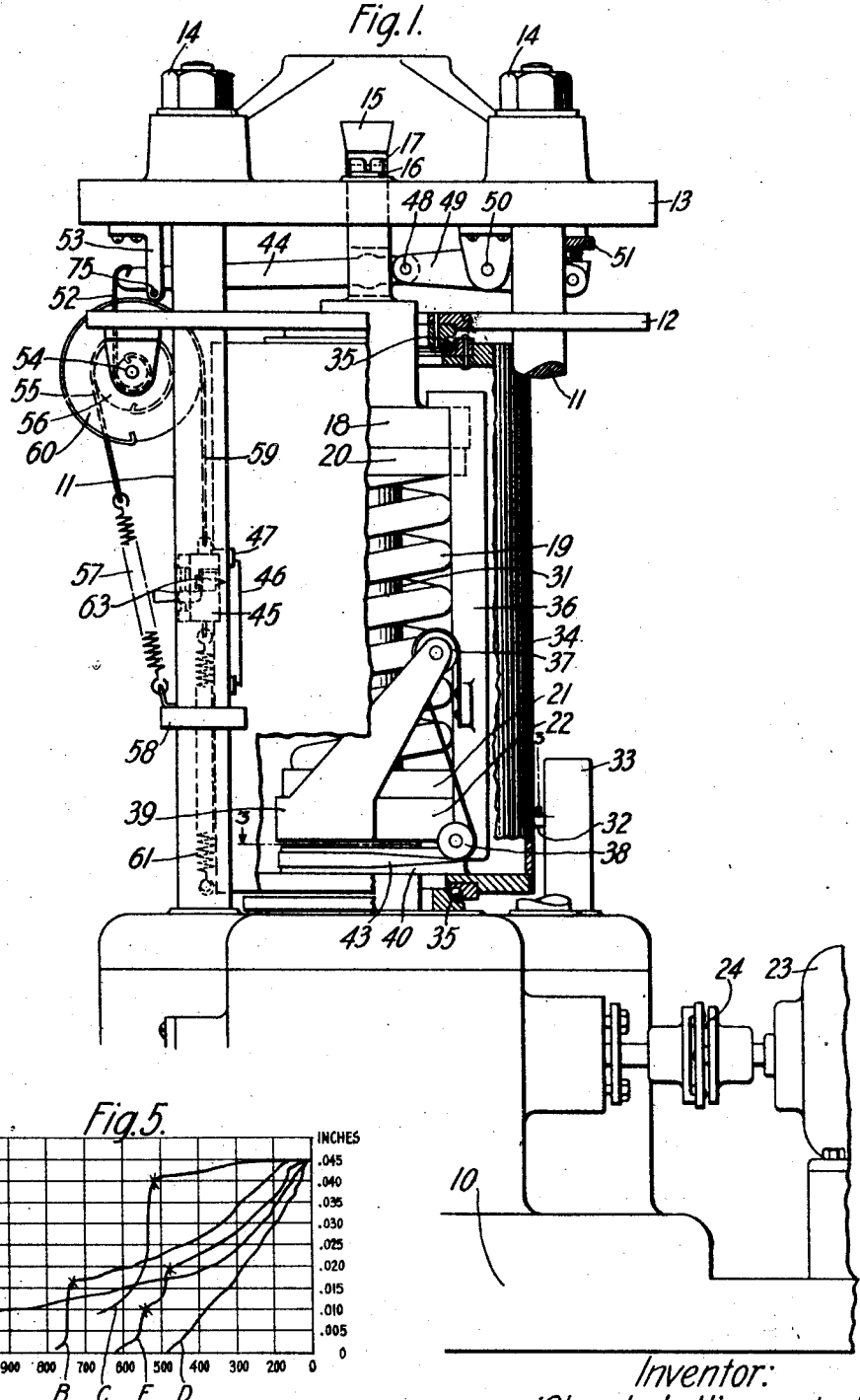

The various parts of the testing machine shown in the drawing are supported by a frame comprising a base portion 10, upright members 11 and upper supporting members 12, 13 and 58. The nuts 14 are secured to the threaded end portions of the upright members 11 for securing them to the upper supporting members 12 and 13 and to the base 10. A stationary jaw member 15 and a movable jaw member 16, having oppositely disposed parallel surfaces, are provided for applying pressure to the material under test which is inserted for this purpose through the guide 17. The stationary jaw member 15 fits into an opening in the upper supporting member 13 where it is secured by means of a set screw, not shown. The movable jaw 16 is provided with an enlarged portion or a spring head 18 and is adapted to be urged toward the stationary jaw due to the pressure exerted by the helical compression spring 19. In order that the spring may have a straight line stress-strain characteristic, even under small loads, the ends of the spring are embedded in spring pads 20 and 21, composed of a material having a low melting point and a high compressive strength such as type metal. The spring pad 20 at one end of the spring fits into a recess in the spring head 18 and the spring pad 21 at the other end fits into a recess in a second spring head 22. This second spring head is adapted to be moved upward for compressing the spring 19 by means of a worm gear, screw and nut mechanism, the worm, not shown, being driven by the motor 23 which is coupled to the worm by a suitable overload coupling member 24 to insure against damage to the machine. A rod 32 is secured to the spring head 22 and is adapted to engage a switching mechanism located in a box 33. This switching mechanism may be connected in circuit with the motor 23 and a source of electrical energy and serve to open the circuit or reverse the direction of the current therein when the spring head 22 reaches its highest and lowest positions.

Referring now particularly to Fig. 2 of the drawing, the worm gear 25 which engages at its periphery the worm coupled to motor 23, is provided with an internally threaded sleeve 70 which is secured to the worm gear for engaging the threaded portion of shaft 26. This shaft is provided at its lower end with a portion of square cross-section which is adapted to slide through a guide 27, this guide being secured to the base 10 by means of the screws 28. The worm gear 25 is supported by the bearing members 29 and when it revolves serves to raise or lower the shaft 26. The spring head 22 and the spring pad 21 are fitted on a shoulder portion of shaft 26 to which they are secured by a key 30. The upper end of the shaft 26 is slidably fitted into a bore in shaft 31, this shaft being secured to the spring head 18. A small opening 80 is provided in shaft 31 to permit the escape of air as the shaft 26 moves upward into the bore in shaft 31.

The mechanism for recording the results of the tests comprises a cylinder 34, rotatable in response to the compression of the spring 19 and a device for marking, on a card 46 attached to the cylinder, the relative movements of jaw 16. The cylinder 34 is mounted at each end on ball bearings 35 and motion is imparted thereto by means of a tape and a system of pulleys. One end of the tape 43 is attached to an arm 36 which is secured to the upper spring head 18. The tape passes around the pulleys 37 and 38, the former being secured to an arm 39 attached to the lower spring head 22 and the latter to the arm 36, and then around a sheave 40 secured to the lower end of the cylinder 34. The other end of the tape is secured to the wall of the cylinder 34 by means of an adjustable anchorage 41. A spiral spring 42 is fitted under the cylinder to keep the tape 43 taut at all times and to return the cylinder to its normal position after a test. One end of the spring 42 is secured to the cylinder and the other end to the base 10.

The mechanism for indicating, on the revolving cylinder, the movement of the jaw 16 comprises a lever 44 which projects through a rectangular slot cut into the jaw member 16 and through a system of pulleys, operates the pen carriage 45. This pen carriage is adapted to move parallel to the axis of the cylinder 34 and carries a pen 63 for marking on card 46 secured to the cylinder by means of the guides 47. The fulcrum 48 of the lever 44 may be raised or lowered for adjusting the carriage 45 to a correct initial position. This correction is accomplished by means of a relatively short lever 49 which may be moved about its fulcrum 50 by the knurled adjusting nut 51. One end of a tape 52 is attached to the end of lever 44 opposite its fulcrum, this end of the lever being held in position by the guide 53. A pin 75 is secured to the guide 53 for limiting the downward movement of the end of lever 44. The tape 52 is attached at its other end to a pulley 54, this pulley being the smallest of a bank of three, all of which are rigidly mounted on a shaft 71 supported by the member 12. One end of another tape 55 is attached to the next larger pulley 56, the other end being secured to a spring 57 which is in turn attached to the supporting member 58 of the frame structure. One end of a third tape 59 is secured to the largest pulley 60, the other end being attached to the pen carriage 45. One end of a spring 61 is secured to a portion of the pen carriage, the other end of the spring being attached to the base 10. The pen carriage is adapted to slide along the guides 62 as the pulleys are caused to revolve due to the movement of the jaw 16 and the lever 44. It is seen that the movement of the jaw 16 is multiplied, before being recorded, by the ratio of the arms of lever 44 and by the ratio of the diameter of pulley 60 to that of pulley 54. The spring 61 serves to keep the tapes taut at all times and the spring 57, possessing a somewhat higher restoring force than spring 61, serves to return the pen carriage to its normal position upon the release of the load which urges the movable jaw 16 toward the stationary jaw 15. As shown in Fig. 6 the pen 63 is mounted on a small arm 65 which is pivotally mounted on or connected to the pen carriage 45, and a jockey spring 66 is employed to hold the pen either against or away from the card on the cylinder 34.

The machine has been found to be particularly useful in determining the mechanical properties of rubber or other insulating material. Preparatory to making tests on samples of insulated conductor having a given size core, a portion of the conductor, from which the insulation has been removed, is inserted between the jaws which are then brought in contact therewith. The pen 63 is then positioned against the chart 46 so as to record zero insulation thickness, this being accomplished by means of the adjusting nut 51. The position of the cylinder 34 should, of course, be set so that zero pressure is recorded by the pen 63. It is not required to change the initial setting of pen 63 as long as conductors having the same size cores are being tested.

When the pen has been set to its correct initial position a short sample of insulated conductor is inserted through the guide 17 and between the jaws 15 and 16. The motor 23 is started, thus causing the worm gear 25 and the threaded sleeve 70 to revolve. Consequently, the shaft 26 is moved upward and pressure is applied through the spring 19 to the upper spring head 18 and the jaw member 16 which is secured thereto. The insulation is first compressed into an elliptical form thus subjecting the thin films of insulating material between the wire and the jaw faces to a stress which ultimately causes rupture. During this process the pressure rises slowly at first and then rapidly until the film ruptures and the conductor is suddenly exposed.

As the spring 19 is compressed due to the upward movement of the spring head 22, there is a resulting pull on the tape 43 due to the relative displacement of the pulleys 37 and 38. The cylinder is thus caused to rotate in proportion to the compression of the spring 19 and therefore in proportion to the pressure applied to the sample under test. Due to the arrangement of the pulleys, the movement of the surface of the cylinder is much greater than the relative movements of the spring ends.

As the jaw 16 is moved upward, the resulting movement of the lever 44 causes a clockwise rotation of pulleys 54, 56 and 60 as viewed in Fig. 1. This rotation of the pulleys causes the elongation of spring 57, the contraction of spring 61 and a downward movement of the pen carriage 45. Due to the rotation of the cylinder 34 under the pen and the simultaneous downward movement of the pen carriage 45, a record is obtained on the card 46 which indicates coordinately the relation between the pressure applied to the insulation material under test and the thickness of the insulation. It should be noted that the machine is capable of recording insulation thicknesses from zero to a certain maximum value, so that, in testing insulation having a greater thickness than the maximum value, its actual thickness is not indicated until the thickness is decreased beyond this point.

Fig. 5 shows curves obtained in testing different grades of rubber or other insulating compounds with a machine constructed in accordance with this invention. Curve A of this figure was obtained in a test on a highly distensible high grade rubber compound. Curve B was recorded in testing an average grade of rubber compound used for insulating aerial wire. Curve C is for a brittle insulating compound, and curve D shows the type of curve which may be expected if a soft, semi-plastic rubber compound or cold flowing insulating composition other than rubber is tested. In the last case there is no point of sudden rupture but the insulating material is gradually pushed away from the conductor.

The cross on the curves indicates the point where rupture occurred. When the conductor is not centrally located, the insulation does not fail on both sides of the conductor at the same time and there will be two points of rupture indicated, as shown in curve E. The compressive load at the point of rupture is a numerical measure of the ability of the insulating compound to resist cutting by the conductor. The curves of Fig. 5 indicate that the insulating film is very thin at the time of rupture in the case of high grade resilient compounds but in the case of a brittle compound the rupture occurs before the rubber has undergone much reduction of thickness. This relation between thickness at break and brittleness of the compound affords a measure of the ability of the insulating compound to withstand severe bending.

What is claimed is:

1. A machine for indicating the penetrating effect of a conductor upon its surrounding insulation which comprises a pair of jaws for receiving the insulated conductor, means for slowly forcing one of said jaws toward the other to force the conductor into the insulation upon both sides thereof, means controlled by the movable jaw and means controlled by the conjoint movement of the movable jaw and by the force applying means for automatically graphically indicating the relation between the force applied to the insulated conductor and the penetration of the conductor into the insulation.

2. In combination a pair of jaw members, pressure applying means for urging said jaw members toward each other, means rotatable in response to the conjoint movement of said pressure applying means and one of said jaws, and means for indicating on said rotatable means the relative movement of one of said jaw members.

3. In a testing machine, a frame, a stationary jaw member secured thereto, an oppositely disposed movable jaw member having an enlarged portion, a second plunger member having an enlarged portion, a yieldable means between said enlarged portions, means for moving said plunger member for compressing said yieldable means, a cylinder supported by said frame, means responsive to the conjoint movement of the plunger member and the movable jaw member for rotating said cylinder upon the compression of said yieldable means, and means for registering on said cylinder the movement of said movable jaw member.

4. In a testing machine, a frame, a stationary jaw member and a movable jaw member, means for applying pressure to said movable jaw member to urge it toward said stationary jaw member, pressure indicating means movable in response to the pressure applied to said movable jaw member, a lever in engagement with said movable jaw member, a fulcrum for said lever near one end, means associated with said lever near its other end for indicating the movement of said movable jaw coordinately with respect to said pressure indications, and means for displacing said fulcrum for adjusting the initial setting of the means for indicating the movement of the movable jaw.

5. A machine for testing the insulation of electrical conductors, comprising a frame, a stationary jaw member secured thereto, an oppositely disposed movable jaw member having an enlarged portion and a shaft secured thereto, a second shaft having an enlarged portion, said shaft being adapted to slide along said first mentioned shaft, a yieldable means between said enlarged portions, means for moving one enlarged portion toward the other for compressing said yieldable means, a cylinder supported by said frame, means associated with said enlarged portions for rotating said cylinder in response to the compression of said yieldable means, a lever in engagement with said movable jaw member, a fulcrum for said lever near one end, means associated with said lever near its other end for indicating on the revolving cylinder the thickness of the insulation of the conductor under test and means for displacing said fulcrum for adjusting the initial setting of the means for indicating the insulation thickness.

In witness whereof, I hereunto subscribe my name this 21st day of December A. D., 1926.

CLAUDE L. HIPPENSTEEL.